United States Patent [19]

Murakami et al.

[11] Patent Number: 6,090,890
[45] Date of Patent: *Jul. 18, 2000

[54] RESIN COMPOSITION FOR POWDER PAINTS

[75] Inventors: Ichiro Murakami; Shoji Akamatsu, both of Ichihara; Tetsuro Agawa, Sakai, all of Japan

[73] Assignee: Dow Corning Toray Silicone Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/652,595

[22] PCT Filed: Oct. 12, 1995

[86] PCT No.: PCT/JP95/02093

§ 371 Date: Aug. 13, 1996

§ 102(e) Date: Aug. 13, 1996

[87] PCT Pub. No.: WO96/11988

PCT Pub. Date: Apr. 25, 1996

[30] Foreign Application Priority Data

Oct. 14, 1994 [JP] Japan ..................... 6-275590

[51] Int. Cl.[7] ................................. C08G 77/14
[52] U.S. Cl. .................. 525/104; 525/104; 525/100; 525/474; 525/476; 525/438; 525/446; 525/934
[58] Field of Search .................... 525/474, 476, 525/438, 446, 104, 100, 934

[56] References Cited

U.S. PATENT DOCUMENTS

| | | | |
|---|---|---|---|
| 3,926,885 | 12/1975 | Keil | 525/407 |
| 4,954,580 | 9/1990 | Zahir | 525/476 |
| 5,280,098 | 1/1994 | Witucki et al. | 528/17 |
| 5,422,396 | 6/1995 | Daly et al. | 525/106 |
| 5,464,901 | 11/1995 | Yoshikawa et al. | 525/103 |
| 5,516,858 | 5/1996 | Morita et al. | 525/478 |

FOREIGN PATENT DOCUMENTS

| | | |
|---|---|---|
| 0275051 A2 | 7/1988 | European Pat. Off. . |
| 0590954 A2 | 4/1994 | European Pat. Off. . |
| 0620242 A3 | 10/1994 | European Pat. Off. . |
| 59-59751 | 4/1984 | Japan . |
| 59-96122 | 6/1984 | Japan . |
| 60-28464 | 2/1985 | Japan . |
| 2118188 | 10/1983 | United Kingdom . |

OTHER PUBLICATIONS

Patent Abstracts of Japan, vol. 095, No. 004 (May 31, 1995) & JP 07–026119 (Jan. 27, 1995).

"Powder Coating: Why—How—When", Journal of Paint Technology, vol. 44, No. 565. pp. 30–37, 1972.

*Primary Examiner*—Margaret G. Moore
*Attorney, Agent, or Firm*—Armstrong, Westerman, Hattori, McLeland & Naughton

[57] ABSTRACT

Resin composition for powder paints, that has an excellent curability and excellent electrostatic properties (wraparound) and that provides cured coatings having an excellent appearance, weathering resistance, and mechanical properties, comprising (A) epoxy-functional branched organopolysiloxane and (B) a compound bearing a functional group reactive with the epoxy group, wherein the component (A)/component (B) weight ratio is from 2/98 to 98/2, or comprising (A) epoxy-functional branched organopolysiloxane, (3) a compound bearing a functional group reactive with the epoxy group, and (C) a compound bearing a functional group reactive with the functional group in component (B), wherein the component (A)/(component (B)+component (C)) weight ratio is from 2/98 to 98/2.

9 Claims, No Drawings

RESIN COMPOSITION FOR POWDER PAINTS

TECHNICAL FIELD

This invention relates to a resin composition for powder paints. More particularly, this invention relates to a resin composition for powder paints wherein the said resin composition exhibits an excellent curability and excellent electrostatic properties (wraparound) and provides a cured coating with an excellent appearance, excellent resistance to weathering, and excellent mechanical properties.

BACKGROUND ART

Powder paints do not contain organic solvents, and the corresponding lack of toxicity coupled with contemporary environmental concerns, such as air pollution and the like, has caused annual increases to occur in the consumption of the resin compositions used for powder paints (hereinafter referred to as powder-paint resin compositions). Widely used as powder-paint resin compositions are, for example, compositions whose main component is reactive functional group-containing curable organic resin, e.g., acrylic resin, polyester resin, epoxy resin, and the like, and which may contain any of various curing agents on an optional basis. However, the cured coatings afforded by the cure of such compositions suffer from an inadequate weathering resistance. This has led to various investigations into powder-paint resin compositions that would have the capacity to produce highly weathering-resistant cured coatings. For example, Japanese Patent Application said Open [Kokai or Unexamined] Number Sho 52-66536 [66,536/1977] proposes a powder-paint resin composition comprising hydroxyl-functional polyester resin with an acid number no greater than 40 and straight-chain organopolysiloxane bearing silicon-bonded methoxy. Japanese Patent Application Laid Open [Kokai or Unexamined] Number Sho 58-168667 [168,667/1983] proposes a powder-paint resin composition comprising thermosetting organic resin and epoxy-functional alkoxysilane. Japanese Patent Application Laid Open [Kokai or Unexamined] Number Sho 59-59751 [59,751/1984] proposes a powder-paint resin composition comprising thermosetting organic resin and straight-chain organopolysiloxane having a viscosity of 10 to 10,000 centistokes and functionalized with the amino, mercapto, carboxyl, or phosphate group.

However, each of these powder-paint resin compositions suffers from an unsatisfactory curability and unsatisfactory electrostatic properties (wraparound). Moreover, the coatings afforded by the cure of these compositions still evidence an inadequate weathering resistance. Another problem with these coatings is their unsatisfactory mechanical properties.

The present inventors achieved the present invention as the result of extensive investigations directed to solving the problems described above.

In specific terms, then, the object of the present invention is to provide a powder-paint resin composition that exhibits an excellent curability and excellent electrostatic properties (wraparound) and that generates a cured coating with an excellent appearance, excellent resistance to weathering, and excellent mechanical properties.

DISCLOSURE OF THE INVENTION

The present invention relates to a powder-paint resin composition comprising
(A) epoxy-functional branched organopolysiloxane and
(B) a compound bearing a functional group reactive with the epoxy group,
wherein the component (A)/component (13) weight ratio is from 2/98 to 98/2. The present invention also relates to a powder-paint resin composition comprising
(A) epoxy-functional branched organopolysiloxane,
(B) a compound bearing a functional group reactive with the epoxy group, and
(C) a compound bearing a functional group reactive with the functional group in component (B),
wherein the component (A)/(component (B) +component (C)) weight ratio is from 2/98 to 98/2.

The powder-paint resin composition according to the present invention will be explained in detail in the following.

The epoxy-functional branched organopolysiloxane (A) functions as a base, crosslinker, or additive for the present composition. This component provides the present composition with an improved curability and electrostatic properties (wraparound) as well as an improved appearance (e.g., smoothness and so forth), improved weathering resistance, and improved mechanical properties. The molecular structure of component (A) is not critical as long as this component is branched. In this regard, branched organopolysiloxane denotes organopolysiloxane whose molecular structure contains trifunctional and/or tetrafunctional siloxane units as essential constituent units. Other siloxane units that may be present in such a molecular structure on an optional basis are exemplified by monofunctional and difunctional siloxane units.

Component (A) must contain the epoxy group. The said epoxy group in component (A) is bonded to the silicon in component (A) as an epoxy-functional monovalent organic group, for example, 2,3-epoxypropyl, 3,4-epoxybutyl, 4,5-epoxypentyl, 2-glycidoxyethyl, 3-glycidoxypropyl, 4-glycidoxybutyl, 2-(3,4-epoxycyclohexyl)ethyl, 3-(3,4-epoxycyclohexyl)propyl, and the like. The Si-bonded organic groups present in component (A) in addition to the said epoxy-functional monovalent organic group are exemplified by alkyl such as methyl, ethyl, propyl, butyl, pentyl, hexyl, heptyl, and so forth; alkenyl such as vinyl, allyl, butenyl, pentenyl, hexenyl, and so forth; aryl such as phenyl, tolyl, xylyl, naphthyl, and so forth; aralkyl such as benzyl, phenethyl, and so forth; substituted alkyl such as chloromethyl, 3-chloropropyl, 3,3,3-trifluoropropyl, nonafluorobutylethyl, and so forth; alkoxy such as methoxy, ethoxy, propoxy, butoxy, and so forth; and the hydroxyl group. Methyl, phenyl, alkoxy, and hydroxyl are preferred among the preceding.

Particularly preferred examples of this organopolysiloxane (A) are as follows:

organopolysiloxane with general formula (I)

$$(RSiO_{3/2})_a(R_2SiO_{2/2})_b(SiO_{4/2})_c \quad (I)$$

wherein R is at least 1 selection from the set consisting of monovalent hydrocarbon groups, alkoxy groups, the hydroxyl group, and epoxy-functional monovalent organic groups with the proviso that the said epoxy-functional monovalent organic group constitutes 0.1 to 100 mole % of the total R in this organopolysiloxane (I), and wherein a is a positive number, b is zero or a positive number, and c is zero or a positive number; organopolysiloxane with general formula (II)

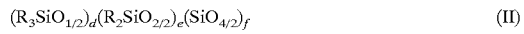
$$(R_3SiO_{1/2})_d(R_2SiO_{2/2})_e(SiO_{4/2})_f \quad (II)$$

wherein R is at least 1 selection from the set consisting of monovalent hydrocarbon groups, alkoxy groups, the hydroxyl group, and epoxy-functional monovalent organic groups with the proviso that the said epoxy-functional monovalent organic group constitutes 0.1 to 70 mole % of the total R in this organopolysiloxane (II), and wherein d is a positive number, e is zero or a positive number, and f is a positive number; and organopolysiloxane with general formula (III)

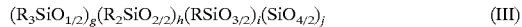

(III)

wherein R is at least 1 selection from the set consisting of monovalent hydrocarbon groups, alkoxy groups, the hydroxyl group, and epoxy-functional monovalent organic groups with the proviso that the said epoxy-functional monovalent organic group constitutes 0.1 to 70 mole % of the total R in this organopolysiloxane (III), and wherein g is a positive number, h is a positive number, i is a positive number, and i is zero or a positive number.

R in general formula (I) is at least 1 selection from the set consisting of monovalent hydrocarbon groups, alkoxy groups, the hydroxyl group, and epoxy-functional monovalent organic groups. The said monovalent hydrocarbon groups are exemplified by alkyl such as methyl, ethyl, propyl, butyl, pentyl, hexyl, heptyl, and so forth; alkenyl such as vinyl, allyl, butenyl, pentenyl, hexenyl, and so forth; aryl such as phenyl, tolyl, xylyl, naphthyl, and so forth; aralkyl such as benzyl, phenethyl, and so forth; and substituted alkyl such as chloromethyl, 3-chloropropyl, 3,3,3-trifluoropropyl, nonafluorobutylethyl, and so forth. The said alkoxy groups are exemplified by methoxy, ethoxy, propoxy, and butoxy. The said epoxy-functional monovalent organic groups are exemplified by 2,3-epoxypropyl, 3,4-epoxybutyl, 4,5-epoxypentyl, 2-glycidoxyethyl, 3-glycidoxypropyl, 4-glycidoxybutyl, 2-(3,4-epoxycyclohexyl)ethyl, and 3-(3, 4-epoxycyclohexyl)propyl.

The said epoxy-functional monovalent organic group preferably constitutes from 0.1 to 100 mole % and more preferably from 5 to 100 mole % of the total R in organopolysiloxane M. A substantial improvement in the hardness and weathering resistance of the ultimately obtained cured coating cannot be obtained when the epoxy-functional monovalent organic group in the component (A) used makes up less than 0.1 mole % of the total R in the said organopolysiloxane (1). Preferably the epoxy-functional monovalent organic group constitutes from 0.1 to 70 mole % and the phenyl group constitutes from 30 to 99.9 mole %, in each case of the total R in the said organopolysiloxane (I). The particularly preferred ranges here are from 5 to 70 mole % for the epoxy-functional monovalent organic group and 30 to 95 mole % for the phenyl group. A component (A) exhibiting these preferred ranges (0.1 to 70 mole % epoxy-functional monovalent organic group and 30 to 99.9 mole % phenyl group in the total R in the said organopolysiloxane (I)) has an excellent affinity for and compatibility with components (B) and/or (C) and is thereby able to provide an even greater improvement in the weathering resistance of the ultimately obtained cured coating.

R in general formula (II) is at least 1 selection from the set consisting of monovalent hydrocarbon groups, alkoxy groups, the hydroxyl group, and epoxy-functional monovalent organic groups. These groups are exemplified as above. The said epoxy-functional monovalent organic group preferably constitutes from 0.1 to 70 mole % and more preferably from 5 to 70 mole % of the total R in organopolysiloxane (II). The basis for this range is that a good improvement in the hardness and weathering resistance of the ultimately obtained cured coating is obtained when the epoxy-functional monovalent organic group in the component (A) used makes up 0.1 to 70 mole % of the total R in the said organopolysiloxane (II). In another preferred embodiment, the epoxy-functional monovalent organic group constitutes from 0.1 to 70 mole % and the phenyl group constitutes from 30 to 99.9 mole %, in each case of the total R in the said organopolysiloxane (II). The particularly preferred ranges here are from 5 to 70 mole % for the epoxy-functional monovalent organic group and 30 to 95 mole % for the phenyl group. A component (A) exhibiting these preferred ranges (0.1 to 70 mole % epoxy-functional monovalent organic group and 30 to 99.9 mole % phenyl group in the total R in the said organopolysiloxane (II)) has an excellent affinity for and compatibility with components (B) and/or (C) and is thereby able to provide an even greater improvement in the weathering resistance of the ultimately obtained cured coating.

R in general formula (III) is at least 1 selection from the set consisting of monovalent hydrocarbon groups, alkoxy groups, the hydroxyl group, and epoxy-functional monovalent organic groups. These groups are exemplified as above. The said epoxy-functional monovalent organic group preferably constitutes from 0.1 to 70 mole % and more preferably from 5 to 70 mole % of the total R in organopolysiloxane (III). The basis for this range is that a good improvement in the hardness and weathering resistance of the ultimately obtained cured coating is obtained when the epoxy-functional monovalent organic group in the component (A) used makes up 0.1 to 70 mole % of the total R in the said organopolysiloxane (III). In another preferred embodiment, the epoxy-functional monovalent organic group constitutes from 0.1 to 70 mole % and the phenyl group constitutes from 30 to 99.9 mole %, in each case of the total R in the said organopolysiloxane (III). The particularly preferred ranges here are from 5 to 70 mole % for the epoxy-functional monovalent organic group and 30 to 95 mole % for the phenyl group. A component (A) exhibiting these preferred ranges (0.1 to 70 mole % epoxy-functional monovalent organic group and 30 to 99.9 mole % phenyl group in the total R in the said organopolysiloxane (III)) has an excellent affinity for and compatibility with components (B) and/or (C) and is thereby able to provide an even greater improvement in the weathering resistance of the ultimately obtained cured coating.

The method for synthesizing component (A) is not critical. One example of the synthesis of component (A) consists of running a reequilibration reaction, in the presence of acid or alkali catalyst, between epoxy-functional alkoxysilane and a branched organopolysiloxane that has been preliminarily synthesized by the hydrolysis and condensation of organotrichlorosilane and/or tetrachlorosilane and optionally triorganomonochlorosilane and diorganodichlorosilane. Another example of the synthesis of component (A) consists of running a condensation reaction, in the presence of an acid, alkali, or organometallic compound catalyst, between epoxy-functional alkoxysilane and a commercially available branched organopolysiloxane containing, for example, Si-bonded hydroxyl or Si-bonded alkoxy.

The physical properties of component (A) are also not critical, but a softening point in the range from −90° C. to 150° C. is preferred. The use of component (A) with a softening point in this range provides the present composition with excellent electrostatic properties (wraparound). Furthermore, such a component (A) can be liquefied by heating and blended to homogeneity with components (B) and/or (C), which makes possible a substantial improvement in the appearance, weathering resistance, and mechanical properties of the ultimately obtained cured coating. In addition, the use of component (A) with a softening point in the range from room temperature to 150° C. makes possible the blending of sufficient quantities of said component (A) into the present composition to achieve even further improvements in the weathering resistance of the ultimately obtained cured coating.

Component (B), which is a compound bearing a functional group reactive with the epoxy group, functions as a base or crosslinker for the present composition. The said epoxy-reactive functional group in component (B) is exemplified by the amino group, carboxyl group, carboxylic anhydride group, hydroxyl group, and tert-butyl ester group. Among these functional groups, the tert-butyl ester group generates the carboxyl group by isobutene elimination when heated, thus providing an improved storage stability for the present composition. When heated, this group generates the carboxyl group and thereby makes possible rapid curing of the present composition.

The subject component (B) is exemplified by organic resins such as acrylic resins, fluororesins, polyester resins, and the like, and by relatively low-molecular-weight compounds. One example of a method for the preparation of an acrylic resin (B) consists of the polymerization of a vinyl monomer containing a functional group such as the hydroxyl group, carboxyl group, carboxylic anhydride group, etc. Another example consists of copolymerization by well-known techniques of vinyl monomer as described above with another vinyl monomer copolymerizable with the former. Hydroxyl-functional vinyl monomers are exemplified by the hydroxyalkyl esters of (meth)acrylic acid, such as 2-hydroxyethyl acrylate, 2-hydroxyethyl methacrylate, 2-hydroxypropyl acrylate, 4-hydroxybutyl acrylate, and so forth; hydroxyl-substituted vinyl ethers such as 2-hydroxyethyl vinyl ether, 3-hydroxypropyl vinyl ether, 4-hydroxybutyl vinyl ether, 6-hydroxyhexyl vinyl ether, and the like; and hydroxyl-functional allyl ethers such as 2-hydroxyethyl allyl ether, 2-hydroxypropyl allyl ether, and so forth. The hydroxyalkyl esters of (meth)acrylic acid are preferred for their good copolymerizability.

Carboxyl-functional vinyl monomers are exemplified by unsaturated monobasic acids such as acrylic acid, methacrylic acid, crotonic acid, and so forth; unsaturated dibasic acids such as maleic acid, fumaric acid, itaconic acid, and so forth; the hemiesters of the preceding unsaturated dibasic acids with monoalcohols such as methanol, ethanol, n-propanol, n-butanol, isobutanol, etc.; and the monovinyl esters of saturated dibasic acids such as succinic acid, adipic acid, sebacic acid, and so forth. The carboxylic anhydride group-containing vinyl monomers are exemplified by maleic anhydride, itaconic anhydride, and methacrylic anhydride. The tert-butyl ester group-containing vinyl monomers are exemplified by tert-butyl acrylate, tert-butyl methacrylate, tert-butyl crotonate, and the like.

Vinyl monomers copolymerizable with the above-described functionalized vinyl monomers are exemplified by (meth)acrylate esters such as methyl acrylate, ethyl acrylate, n-propyl acrylate, isopropyl acrylate, n-butyl acrylate, isobutyl acrylate, cyclohexyl acrylate, 2-ethylhexyl acrylate, n-octyl acrylate, 2-ethyloctyl acrylate, dodecyl acrylate, benzyl acrylate, methyl methacrylate, ethyl methacrylate, n-propyl methacrylate, isopropyl methacrylate, n-butyl methacrylate, isobutyl methacrylate, n-hexyl methacrylate, cyclohexyl methacrylate, 2-ethylhexyl methacrylate, n-octyl methacrylate, 2-ethyloctyl methacrylate, dodecyl methacrylate, benzyl methacrylate, phenyl methacrylate, and the like; the diesters of unsaturated dicarboxylic acids, such as dimethyl fumarate, diethyl fumarate, di-n-butyl fumarate, dimethyl itaconate, diethyl itaconate, di-n-butyl itaconate, dimethyl maleate, diethyl maleate, di-n-butyl maleate, and the like: aromatic vinyl monomers such as styrene, vinyltoluene, tert-butylstyrene, alpha-methylstyrene, and the like; nitrogenous monomers such as acrylonitrile, methacrylonitrile, acrylamide, methacrylamide, and so forth; as well as the vinyl esters and vinyl ethers. The aromatic vinyl monomers such as styrene, vinyltoluene, tert-butylstyrene, and the like are preferred because they provide an excellent compatibility between component (A) and the corresponding component (B). The aromatic vinyl monomer is preferably used at from 5 to 70 weight % and more preferably at from 10 to 60 weight % of the total vinyl monomer.

The fluororesin (B) can be prepared, for example, by copolymerization by well-known techniques of fluorinated monomer having the fluorine atom bonded to a doubly-bonded carbon atom, the above-described vinyl monomer carrying a functional group such as the hydroxyl group, carboxyl group, acid anhydride group, etc., and optionally other vinyl monomer copolymerizable with the aforementioned vinyl monomers. The subject fluorinated monomer is exemplified by fluorinated alpha-olefins such as vinyl fluoride, vinylidene fluoride, trifluoroethylene, tetrafluoroethylene, chlorotrifluoroethylene, bromotrfuoroethylene, pentafluoropropylene, hexafluoropropylene, and so forth, and by perfluoroalkyl perfluorovinyl ethers such as trifluoromethyl trifluorovinyl ether, pentafluoroethyl trifluorovinyl ether, heptafluoropropyl trifluorovinyl ether, and so forth.

The other vinyl monomer copolymerizable with the fluorinated monomer is exemplified by alkyl vinyl ethers and substituted alkyl vinyl ethers such as methyl vinyl ether, ethyl vinyl ether, n-propyl vinyl ether, isopropyl vinyl ether, n-butyl vinyl ether, isobutyl vinyl ether, tert-butyl vinyl ether, n-pentyl vinyl ether, n-hexyl vinyl ether, n-octyl vinyl ether, 2-ethylhexyl vinyl ether, chloromethyl vinyl ether, chloroethyl vinyl ether, benzyl vinyl ether, phenylethyl vinyl ether, and so forth; cycoalkyl vinyl ethers such as cyclopentyl vinyl ether, cyclohexyl vinyl ether, methylcyclohexyl vinyl ether, and the like; the vinyl esters of aliphatic carboxylic acids such as vinyl 2,2-dimethylpropanoate, vinyl 2,2-dimethylbutanoate, vinyl 2,2-dimethylpentanoate, vinyl 2,2-dimethylhexanoate, vinyl 2-ethyl-2-methylbutanoate, vinyl 2-ethyl-2-methylpentanoate, vinyl 3-chloro-2,2-dimethylpropanoate, vinyl acetate, vinyl propionate, vinyl butyrate, vinyl isobutyrate, vinyl caproate, vinyl caprylate, vinyl caprate, vinyl laurate, the vinyl esters of branched aliphatic carboxylic acids having $C_8$ to $C_{10}$ alkyl groups, vinyl stearate, and so forth; and the vinyl esters of ring structure-containing carboxylic acids, such as vinyl cyclohexanecarboxylate, vinyl methylcyclohexanecarboxylate, vinyl benzoate, vinyl para-tert-butylbenzoate, and so forth.

One example of the preparation of a polyester resin (B) consists of the synthesis of carboxyl-functional and/or hydroxyl-functional polyester resin by the polycondensation by well-known techniques of polycarboxylic acid with polyhydric alcohol. Another example consists of the synthesis of carboxylic anhydride-functional polyester resin by the partial depolymerization of a preliminarily synthesized polyester resin by the addition thereto of a large excess of a compound containing both the carboxylic anhydride moiety and carboxyl group, for example, trimellitic anhydride. The polycarboxylic acid is exemplified by aromatic polycarboxylic acids such as phthalic acid, isophthalic acid, terephthalic acid, trimellitic acid, naphthalenedicarboxylic acid, and the like, and by reactive derivatives of the preceding, such as the methyl esters and carboxylic anhydrides; by alicyclic polycarboxylic acids such as hexahydrophthalic acid, 1,4-cyclohexanedicarboxylic acid, 1,3-cyclohexanedicarboxylic acid, etc., as well as reactive derivatives thereof; and by aliphatic polycarboxylic acids such as succinic acid, adipic acid, sebacic acid, 1,12-dodecanedicarboxylic acid, etc., as well as reactive derivatives thereof. The polyhydric alcohol is exemplified by ethylene glycol, propylene glycol, 1,4-butanediol, 1,5-pentanediol, 1,6-hexanediol, neopentyl glycol, diethylene glycol, triethylene glycol, the alkylene oxide adducts of hydrogenated bisphenol A, glycerol, trimethylolpropane, trimethylolethane, pentaerythritol, and so forth.

The subject organic resin (B) preferably has an acid value from 10 to 300 and/or a hydroxyl value from 0 to 100 because such values give a composition with an excellent curability and storage stability and also yield a cured coating with an excellent appearance. The organic resin is preferably a solid at room temperature. Moreover, its softening point is preferably from 50° C. to 200° C. and more preferably from 60° C. to 150° C. The use of organic resin with a softening point from 50° C. to 200° C. as component (B) serves to improve the storage stability of the present composition and also to improve the smoothness of the ultimately obtained cured coating. When an acrylic resin is used as component (B), the acrylic resin preferably has a number-average molecular weight from 1,000 to 20,000 and more preferably from 2,000 to 10,000. when a fluororesin is used as component (B), the fluororesin preferably has a number-average molecular weight from 3,000 to 30,000 and more preferably from 7,000 to 15,000.

The relatively low-molecular-weight compounds encompassed by component (B) are exemplified by polycarboxylic acids, polycarboxylic anhydrides, and amino-functional compounds. The polycarboxylic acids encompassed by component (B) are exemplified by aliphatic polycarboxylic acids such as succinic acid, glutaric acid, adipic acid, pimelic acid, suberic acid, azelaic acid, sebacic acid, 1,10-decanedicarboxylic acid, 1,12-dodecanedicarboxylic acid, 1,20-eicosanedicarboxylic acid, 1,24-tetraeicosanedicarboxylic acid, and so forth; by unsaturated polycarboxylic acids such as maleic acid, citraconic acid, itaconic acid, glutaconic acid, and the like; by aromatic polycarboxylic acids such as pyromellitic acid, trimellitic acid, phthalic acid, isophthalic acid, and so forth; and by alicyclic polycarboxylic acids such as hexahydrophthalic acid, 1,4-cyclohexanedicarboxylic acid, and so forth. Preferred are aliphatic dibasic acids such as sebacic acid, 1,10-decanedicarboxylic acid, 1,12-dodecanedicarboxylic acid, 1,20-eicosanedicarboxylic acid, and so forth.

The polycarboxylic anhydrides encompassed by component (B) are exemplified by the anhydrides of the above-described polycarboxylic acids, such as succinic anhydride, maleic anhydride, sebacic anhydride, phthalic anhydride, hexahydrophthalic anhydride, itaconic anhydride, trimellitic anhydride, pyromellitic anhydride, and so forth. Preferred are the anhydrides of aliphatic dibasic acids such as sebacic acid, 1,10-decanedicarboxylic acid, 1,12-dodecanedicarboxylic acid, and 1,20-eicosanedicarboxylic acid. Mixtures of the described polycarboxylic anhydrides and polycarboxylic acids can also be used.

The amino-functional compounds encompassed by component (B) are exemplified by dicyandiamide, polyamine compounds, and imidazoles. Dicyandiamide, polyamine compounds, and their mixtures are preferred. The polyamine compounds encompassed by component (B) are exemplified by polyhydrazide compounds such as adipic dihydrazide, sebacic dihydrazide, and the like. The imidazoles encompassed by component (B) are exemplified by imidazole compounds carrying alkyl or substituted alkyl substituents, such as 2-methylimidazole, 2-ethylimidazole, 2-heptadecylimidazole, 1-benzyl-2-methylimidazole, 1-(2-cyanoethyl)-2-undecylimidazole, and the like; aminotriazine ring-containing imidazole compounds such as 1-[2-(4,6-diamino-1,3,5-tiazin-2-yl)ethyl]-2-methylimidazole, 1-[2-(4,6-diamino-1,3,5-triazin-2-yl)ethyl]-2-ethyl-4-methylimidazole, and the like; and imidazole/carboxylic acid salts such as the salt between trimellitic acid and 1-cyanoethyl-2-ethyl4-methylimidazole, the salt between trimellitic acid and 1-cyanoethyl-2-methylimidazole, and so forth.

Component (B) in the present composition may take the form of a single selection or a mixture of two or more selections. Examples in this regard are 1 selection from the above-described organic resins and mixtures of 2 or more selections from the organic resins; 1 selection from the above-described relatively low-molecular-weight compounds and mixtures of 2 or more selections therefrom: mixtures of an organic resin as described above with a relatively low-molecular-weight compound; mixtures of different types of organic resins, such as mixtures of an acrylic resin with a polyester resin; mixtures of the same type of organic resins having different functional groups; mixtures of the same type of organic resins having different functional group contents; and mixtures of the same type of organic resins having different physical properties (e.g., different softening points). Component (B) may contain a single species of functional group or two or more species of functional groups. However, the amino group/carboxylic anhydride combination and hydroxyl group/carboxylic anhydride combination are fairly undesirable because the high reactivities of these functional groups with each other cause a decline in the storage stability of the present composition and a decline in the appearance of the cured coating.

Component (C) is a compound bearing a functional group reactive with the functional group in component (B), and the functional group in component (C) is exemplified by epoxy, N-hydroxyalkylcarboxamide, alkoxymethylamino, alkoxymethylamide, cyclocarbonate, oxazoline, and blocked isocyanate groups. Component (C) is exemplified by vinyl polymers such as acrylic resins, fluororesins, and the like; organic resins such as epoxy resins and so forth; and relatively low-molecular-weight compounds. The functional group in said vinyl polymers is preferably the epoxy group and/or cyclocarbonate group. The synthesis of epoxy-functional and/or cyclocarbonate-functional acrylic resin encompassed by component (C) is exemplified by the (co)polymerization by well-known techniques of epoxy-functional vinyl monomer and/or cyclocarbonate-functional vinyl monomer and by the copolymerization by well-known techniques of these vinyl monomers with optional other vinyl monomer copolymerizable with the former. The epoxy-functional vinyl monomer is exemplified by the (beta-methyl)glycidyl esters of (meth)acrylic acid, such as glycidyl acrylate, beta-methylglycidyl acrylate, glycidyl methacrylate, beta-methylglycidyl methacrylate, and the like; alicyclic epoxy-functional (meth)acrylic acid esters such as 3,4-epoxycyclohexyl acrylate, 3,4-epoxycyclohexylmethyl acrylate, 3,4-epoxycyclohexyl methacrylate, 3,4-epoxycyclohexylmethyl methacrylate, and so forth; the (beta-methyl)glycidyl ethers of allyl alcohol; the (beta-methyl)glycidyl ethers of methallyl alcohol; glycidyl vinyl ether; N-glycidylacrylamide; and glycidyl vinylsulfonate.

The cyclocarbonate-functional vinyl monomer is exemplified by (meth)acrylate ester monomers such as 4-(meth)acryloyloxymethyl-1,3-dioxolan-2-one, 4-methyl-4-(meth)acryloyloxymethyl-1,3-dioxolan-2-one, 4-(meth)acryloyloxymethyl-4,5-dimethyl-1,3-dioxolan-2-one, 4-ethyl-4-(meth)acryloyloxymethyl-1,3-dioxolan-2-one, 4-n-propyl-4-(meth)acryloyloxymethyl-1,3-dioxolan-2-one, 4-n-butyl-4-(meth)acryloyloxymethyl-1,3-dioxolan-2-one, and so forth; crotonate ester monomers such as 4-crotonoyloxymethyl-1,3-dioxolan-2-one, 4-methyl-4-crotonoyloxymethyl-1,3-dioxolan-2-one, and so forth; vinyl ester monomers such as monovinyl mono(1,3-dioxolan-2-on-4-ylmethyl) succinate, monovinyl mono(1,3-dioxolan-2-on-4-ylmethyl) adipate, and so forth; and vinyl ether monomers such as 4-vinyloxymethyl-1,3-dioxolan-2-one, 4-methyl-4-vinyloxymethyl-1,3-dioxolan-2-one, and so forth.

Vinyl monomer copolymerizable with the preceding vinyl monomers is exemplified as provided above. Aromatic vinyl monomers such as styrene, vinyltoluene, tert-butylstyrene, alpha-methylstyrene, and the like are again preferred because they provide an excellent compatibility between the obtained component (C) and components (A) and (B). The aromatic vinyl monomer is preferably used at from 5 to 70 weight % and more preferably at from 10 to 60 weight % of the total vinyl monomer.

An example of the preparation of epoxy-functional and/or cyclocarbonate-functional fluororesin encompassed by component (C) consists of the copolymerization by well-known techniques of the above-described epoxy-functional vinyl monomer and/or cyclocarbonate-functional vinyl monomer with fluorinated monomer as described above and optionally also vinyl monomer copolymerizable with the other vinyl monomers involved.

Among the acrylic resins and fluororesins described above, epoxy-functional acrylic resins that are solid at room temperature are the most preferred. These acrylic resins preferably have a softening point from 50° C. to 200° C. and more preferably from 60° C. to 150° C. The use of acrylic resin with a softening point from 50° C. to 200° C. as component (C) serves to improve the storage stability of the composition and also to improve the smoothness of the ultimately obtained cured coating. This acrylic resin preferably has an epoxy equivalent weight from 200 to 2,000 and particularly preferably from 300 to 1,000. Moreover, the acrylic resin preferably has a number-average molecular weight from 1,000 to 20,000 and more preferably from 2,000 to 10,000.

Epoxy resin encompassed by component (C) is exemplified by bisphenol A epoxy resins, bisphenol F epoxy resins, epoxy novolac resins, and alicyclic epoxy resins. These epoxy resins are commercially available as Epiclon 1050, Epiclon 2050, and Epiclon 4050 (brand names for bisphenol A epoxy resins from Dainippon Ink Kagaku Kogyo Kabushiki Kaisha); Epikote 1001, Epikote 1002, Epikote 1003, and Epikote 1004 (brand names for bisphenol A epoxy resins from Shell (Netherlands)); Araldite CY175 (brand name for alicyclic epoxy resin from Ciba-Geigy (Switzerland)); and Epolead EHP3150 (brand name for modified epoxy resin from Daicel Ltd.). While the state of the epoxy resin used can range from liquid at room temperature to solid at room temperature, epoxy resins that are solid at room temperature are preferred. Moreover, the epoxy resin preferably has a softening point from 50° C. to 200° C. and more preferably from 60° C. to 150° C. The epoxy equivalent weight of the epoxy resin is preferably from 200 to 2,000.

The relatively low-molecular-weight compounds encompassed by component (C) are exemplified by triglycidyl isocyanurate, carboxamide compounds that contain at least 2 hydroxyalkyl groups on nitrogen, blocked isocyanates, N,N,N',N'-tetraalkoxymethylglycolurils, and liquid epoxy compounds. N,N'-bis(2-hydroxyethyl)adipamide is an example of a component (C) carboxamide that contains at least 2 hydroxyalkyl groups on nitrogen, and this compound is available under the brand name Primid XL-552 from the Rohm and Haas Company (United States).

The blocked isocyanates encompassed by component (C) are exemplified by the blocked isocyanates afforded by blocking various isocyanates with a blocking agent as well as by compounds containing the uretodione bond as yielded by the cyclodimerization of the isocyanate group. Blocking agents make possible regeneration of the isocyanate by heating. The isocyanates are exemplified by aromatic diisocyanates such as toluene diisocyanate, diphenylmethane diisocyanate, and the like; aralkyl diisocyanates such as m-xylylene diisocyanate and the like; aliphatic and alicyclic diisocyanates such as hexamethylene diisocyanate, lysine diisocyanate, isophorone diisocyanate, and the like; isocyanate-containing prepolymers as afforded by the addition of polyhydric alcohol to the aforementioned isocyanates; and isocyanurate ring-containing prepolymers as afforded by the cyclodimerization of the aforementioned isocyanates. The aliphatic and alicyclic diisocyanates and prepolymers derived therefrom are preferred because they generate a particularly good weathering resistance for the cured coating afforded by the cure of the present composition. The blocking agents are exemplified by alcohols such as methanol, ethanol, benzyl alcohol, and so forth; phenols such as phenol, cresol, and so forth; lactams such as epsilon-caprolactam, butyrolactam, and so forth; and oximes such as acetone oxime, methyl ethyl ketoxime, and so forth.

The N,N,N',N'-tetraalkoxymethylglycolurils encompassed by component (C) are exemplified by N,N,N',N'-tetramethoxymethylglycoluril, a compound which can be obtained commercially under the brand name "Powderlink 1174" from the American Cyanamid Company (United States). The liquid epoxy compounds encompassed by component (C) are exemplified by neopentyl glycol diglycidyl ether, glycerol triglycidyl ether, sorbitol polyglycidyl ether, the diglycidyl ester of adipic acid, and the diglycidyl ester of terephthalic acid.

The specific combination of components (A), (B), and (C) is not crucial for the present composition, although component (C) should be appropriately selected based on the properties of component (A) or (3) and the nature of the functional group carried by component (B). As examples of particular combinations of components (A), (B), and (C), when component (B) is a carboxyl-functional, carboxylic anhydride-functional, or tert-butyl ester-containing compound, component (C) preferably takes the form of an epoxy-functional acrylic resin that is solid at room temperature and/or epoxy resin that is solid at room temperature, or triglycidyl isocyanurate, or carboxamide bearing at least 2 hydroxyalkyl groups on nitrogen. When component (B) is a hydroxyl-functional compound, component (C) is preferably a blocked isocyanate or N,N,N',N'-tetraalkoxymethylglycoluril.

The component (A)/component (B) weight ratio in the present composition must be in the range from 98/2 to 2/98. When component (B) takes the form of a relatively low-molecular-weight compound such as a polycarboxylic acid, polycarboxylic anhydride, or amino-functional compound, this weight ratio preferably falls in the range from 98/2 to 70/30 and more preferably is in the range from 97/3 to 80/20. When component (B) is an organic resin such as acrylic resin, fluororesin, or polyester resin, the weight ratio under consideration is preferably in the range from 90/10 to 10/90 and more preferably is in the range from 85/15 to 15/85. The present composition must have the component (A)/component (B) weight ratio described above, but in addition preferably contains 0.2 to 5.0, more preferably 0.4 to 2.5, and even more preferably 0.5 to 2.0 equivalents of epoxy-reactive functional groups in component (3) with reference to the epoxy groups in component (A).

The component (A)/(component (B) +component (C)) weight ratio in the present composition must fall in the range from 98/2 to 2/98. When component (B) is a relatively low-molecular-weight compound such as a polycarboxylic acid, polycarboxylic anhydride, or amino-functional compound and component (C) is also a relatively low-molecular-weight compound, the weight ratio under consideration is preferably in the range from 98/2 to 50/50 and more preferably is in the range from 97/3 to 60/40. When either of component (B) or (C) is an organic resin such as acrylic resin, fluororesin, polyester resin, or epoxy resin, this weight ratio preferably falls in the range from 90/10 to 10/90 and more preferably falls in the range from 85/15 to 15/85. The present composition must have the component (A)/(component (B)+component (C)) weight ratio described above, but in addition preferably contains 0.2 to 5.0, more preferably 0.4 to 2.5, and even more preferably 0.5 to 2.0 equivalents of epoxy-reactive functional groups in component (3) relative to the sum of the epoxy groups in component (A) and the component (C) functional groups that are reactive with the functional groups in component (B).

The above-described components (A) and (B)—or (A), (B), and (C)—are the essential components of the present composition. Components that may also be present on an optional basis are exemplified by curing catalysts such as dibutyltin diacetate, dibutyltin dilaurate, para-toluenesulfonic acid, triphenylphosphine, and the like; inorganic fillers such as silica, quartz powder, titanium oxide, and the like; organic and inorganic pigments such as carbon black, iron oxide red, iron oxide yellow, iron oxide black, and so forth; fluidity regulators; ultraviolet absorbers; antioxidants; cellulose derivatives such as nitrocellulose, cellulose acetate butyrate, and so forth; and organic resins such as chlorinated polyethylene, chlorinated polypropylene, petroleum resins, chlorinated rubbers, and the like.

The particular process used to prepare the present composition is not crucial, and the well-known technologies can be used here. One example of the preparation of the present composition consists of first blending components (A) and (B) or (A), (B), and (C) along with any optional components and thereafter melt-mixing this blend. The powder paint can be prepared by finely grinding and classifying the thereby obtained composition using a mechanical grinding technology.

The present composition exhibits an excellent curability and excellent electrostatic properties (wraparound) and in consequence thereof will form a cured coating on any of various substrates when applied to the substrate by a conventional method, e.g., flame coating, fluidized immersion, electrostatic spray, etc., and thereafter baked on the substrate, for example, at 100° C. to 250° C. for about 1 to 60 minutes.

BEST MODES FOR EXECUTING THE INVENTION

The powder-paint resin composition according to the present invention will be explained in greater detail in the following through working examples. The viscosity values reported in the examples were measured at 25° C. The following abbreviations were used in the structural formulas: Me for methyl, Ph for phenyl, and Ep for 3-glycidoxypropyl. Mn indicates the number-average molecular weight and Mw indicates the weight-average molecular weight. The softening points of the organopolysiloxanes were measured on a hot plate using a microscope. The softening points of the other components were measured by the ring-and-ball method.

REFERENCE EXAMPLE 1

250 g water and 400 g toluene were introduced into a reactor. While regulating the liquid temperature of the system to 10° C., a liquid mire of 300 g phenyltrichlorosilane and 200 g toluene was added dropwise to the system. Heating under reflux was carried out for 6 hours after the completion of addition. The toluene solution was thereafter separated off and repeatedly washed with 300-g portions of water until the wash solution was neutral. The toluene solution was then heated under reduced pressure to distill out the toluene, thereby yielding 177.7 g of a solid white organopolysiloxane.

REFERENCE EXAMPLE 2

100 g water, 400 g toluene, and 140 g isopropanol were introduced into a reactor. While regulating the liquid temperature of the system to 10° C., a liquid mixture of 336.7 g phenyltrichlorosilane, 126 g dimethyldichlorosilane, and 126 g toluene was added dropwise. Heating under reflux was carried out for 1 hour after the completion of addition. The toluene solution was thereafter separated off and repeatedly washed with 300-g portions of water until the wash solution was neutral, thereby yielding 452 g of a toluene solution of organopolysiloxane (50 weight % solids).

REFERENCE EXAMPLE 3

51.6 g of the organopolysiloxane whose synthesis is described in Reference Example 1, 23.6 g 3-glycidoxypropyltrimethoxysilane, 159.4 g toluene, and 0.08 g cesium hydroxide were introduced into a reactor. 5.0 g water was added to the system, and the system was thereafter heated while distilling out the evolved methanol and water. After the distillation of water had ended, the system was cooled and another 5.0 g water was added to the system. The system was again heated while distilling out the evolved methanol and water. This process was repeated, during which sequence the distilled-out water was extracted with ether. Heating was ended when gas chromatography on this confirmed the absence of methanol production. The solids concentration was then adjusted to 30 weight % and the system was again heated under reflux. A sample was collected each hour and neutralized and the molecular weight was measured on the neutralized sample by gel permeation chromatography (GPC). The system was cooled when it was confirmed that the molecular weight distribution had become constant. After cooling the system was neutralized by the introduction of 0.05 g acetic acid. The salt product was then filtered off and the filtrate was heated under reduced pressure to yield 64.7 g of a colorless and transparent solid. This colorless, transparent solid (designated as A-1) had the following values: Mn=2,300, Mw=3,820, glass-transition point=106° C., softening point=142° C., and epoxy equivalent weight=680. $^{29}$Si-nuclear magnetic resonance spectroscopic analysis (NMR) confirmed this product to be the 3-glycidoxypropyl-functionalized organopolysiloxane with the formula given below.

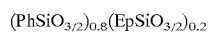

REFERENCE EXAMPLE 4

116.9 g of the 50 weight % toluene solution of organopolysiloxane whose synthesis is described in Reference Example 2, 3.7 g octamethyltetracyclosiloxane, 12.1 g 3-glycidoxypropyltrimethoxysilane, 12.1 g toluene, and 0.08 g cesium hydroxide were introduced into a reactor. 5.0 g water was added to the system, and the system was thereafter heated while distilling out the evolved methanol and water. After the distillation of water had ended, the system was cooled and another 5.0 g water was added to the system. The system was again heated while distilling out the evolved methanol and water. This process was repeated, during which sequence the distilled-out water was extracted with ether. Heating was ended when gas chromatography on this confirmed the absence of methanol production. The solids concentration was then adjusted to 50 weight % and the system was again heated under reflux. A sample was collected each hour and neutralized and the molecular weight was measured on the neutralized sample by GPC. The system was cooled when it was confirmed that the molecular weight distribution had become constant. After cooling the system was neutralized by the introduction of 0.05 g acetic acid. The salt product was then filtered off and the filtrate was heated under reduced pressure to yield 67.4 g of a colorless and transparent solid. This colorless, transparent solid (designated as A-2) had the following values: Mn=2,320, Mw=3,950, glass-transition point=42° C., softening point=65° C., and epoxy equivalent weight=1,470. $^{29}$Si-NMR confirmed this product to be the 3-glycidoxypropyl-functionalized organopolysiloxane with the formula given below.

$$(PhSiO_{3/2})_{0.66}(Me_2SiO_{2/2})_{0.26}(EPSiO_{3/2})_{0.08}$$

REFERENCE EXAMPLE 5

There were introduced into a reactor 500 g of a 70% xylene solution of a compound containing 5% hydroxyl and having a component molar ratio of $(Me_3SiO_{1/2})/SiO_{4/2}=1.0$, 105 g 3-glycidoxypropylmethyldimethoxysilane, and 3.5 g barium hydroxide. The system was then heated and the evolved water and methanol were distilled out as the azeotrope with xylene. After cooling, the system was neutralized by the introduction of 2.8 g acetic acid. The salt product was filtered off and the filtrate was heated under reduced pressure to yield a colorless, transparent solid. This colorless, transparent solid (designated as A-3) had the following values: Mn=1,950, Mw=3,120, and epoxy equivalent weight=890. Although a distinct glass-transition point was not observed in DSC, the softening point was confirmed to not exceed 150° C. This product was confirmed by $^{29}$Si-NMR to be 3-glycidoxypropyl-functionalized organopolysiloxane with the formula given below.

$$(Me_3SiO_{1/2})_{0.45}[Ep(Me)(MeO)SiO_{1/2}]_{0.04}[Ep(Me)SiO_{2/2}]_{0.06}(SiO_{4/2})_{0.45}$$

REFERENCE EXAMPLE 6

There were introduced into a reactor 50 g of a 50% xylene solution of a compound containing 8% hydroxyl and having a molar ratio among its various siloxane units of $(Me_3SiO_{1/2})/(MeSiO_{3/2})/(Ph_2SiO_{2/2})/(PhSiO_{3/2})=5/35/10/50$, 22 g 3-glycidoxypropylmethyldimethoxysilane, and 1.6 g barium hydroxide. The system was then heated and the evolved water and methanol were distilled out as the azeotrope with xylene. After cooling, the system was neutralized by the introduction of 1.3 g acetic acid. The salt product was filtered off and the filtrate was heated under reduced pressure to yield a colorless, transparent solid. This colorless, transparent solid (designated as A-4) had the following values: Mn=2,240, Mw=3,430, glass transition point=23° C., softening point=41° C., and epoxy equivalent weight=450. This product was confirmed by $^{29}$Si-NMR to be 3-glycidoxypropyl-functionalized organopolysiloxane (A-4) with the formula given below.

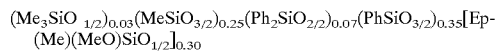

$$(Me_3SiO_{1/2})_{0.03}(MeSiO_{3/2})_{0.25}(Ph_2SiO_{2/2})_{0.07}(PhSiO_{3/2})_{0.35}[Ep(Me)(MeO)SiO_{1/2}]_{0.30}$$

REFERENCE EXAMPLE 7

667 g xylene was introduced into a reactor equipped with a thermometer, stirrer, addition funnel, reflux condenser, and nitrogen inlet and was heated under a nitrogen blanket under reflux. To this was added over a period of 4 hours a mixture of 269 g methyl methacrylate, 431 g n-butyl methacrylate, 200 g styrene, 100 g methacrylic acid, and 40 g azobisisobutyronitrile as polymerization initiator. The reaction was then maintained under reflux for an additional 1 hour. The temperature was subsequently dropped to 100° C. and 5 g azobisisobutyronitrile was added. This same temperature was maintained for 2 hours in order to polymerize unreacted monomer and bring the polymerization reaction to completion. The solvent was then distilled out by heating under reduced pressure to yield a solid carboxyl-functional acrylic resin (designated as B-1) with the following values: softening point by the ring-and-ball method (hereinafter abbreviated as the softening point)=110° C., acid value=65, and Mn=3,500.

REFERENCE EXAMPLE 8

667 g xylene was introduced into a reactor equipped with a thermometer, stirrer, addition funnel, reflux condenser, and nitrogen inlet and was heated under a nitrogen blanket under reflux. To this was added over a period of 4 hours a mixture of 535 g methyl methacrylate, 145 g n-butyl methacrylate, 100 g styrene, 150 g 2-hydroxyethyl methacrylate, 70 g acrylic acid, and 30 g tert-butylperoxy 2-ethylhexanoate as polymerization initiator. The reaction was then maintained under reflux for an additional 1 hour. The temperature was subsequently dropped to 100° C. and 5 g azobisisobutyronitrile was added. This same temperature was maintained for 2 hours in order to polymerize unreacted monomer and bring the polymerization reaction to completion. The solvent was then distilled out by heating under reduced pressure to yield a solid carboxyl- and hydroxyl-functional acrylic resin (designated as B-2) with the following values: softening point=103° C., acid value=54, hydroxyl value=65, and Mn=4,000.

REFERENCE EXAMPLE 9

667 g xylene was introduced into a reactor equipped with a thermometer, stirrer, addition funnel, reflux condenser, and nitrogen inlet and was heated under a nitrogen blanket under reflux. To this was added over a period of 4 hours a mixture of 291 g n-butyl methacrylate, 409 g tert-butyl methacrylate, 300 g styrene, and 30 g azobisisobutyronitrile as polymerization initiator. The reaction was then maintained under reflux for an additional 1 hour. The temperature was subsequently dropped to 100° C. and 5 g azobisisobutyronitrile was added. This same temperature was maintained for 2 hours in order to polymerize unreacted monomer and bring the polymerization reaction to completion. The solvent was then distilled out by heating under reduced pressure to yield a solid tert-butyl ester-containing acrylic resin (designated as B-3) with the following values: softening point=115° C., acid value equivalent to 161.6, and Mn=3,800.

REFERENCE EXAMPLE 10

658.9 g terephthalic acid, 73.2 g isophthalic acid, 405.7 g neopentyl glycol, 20 g trimethylolpropane, and 10 g dibutyltin oxide (catalyst) were introduced into a reactor equipped with a thermometer, stirrer, air-cooled condenser, and nitrogen inlet. The system was heated under a nitrogen current and a dehydration condensation reaction was run for 6 hours at 240° C. to yield a solid carboxyl-functional polyester resin (designated as B-4) with the following values: softening point=120° C., acid value=35, and Mn=3,800.

REFERENCE EXAMPLE 11

767.7 g terephthalic acid, 128.6 g ethylene glycol, 215.7 g neopentyl glycol, 50 g 1,6-hexanediol, and 10 g dibutyltin oxide (catalyst) were introduced into a reactor equipped with a thermometer, stirrer, air-cooled condenser, and nitrogen inlet. The system was heated under a nitrogen current and a dehydration condensation reaction was run for 5 hours at 240° C. to yield a solid carboxyl- and hydroxyl-functional polyester resin (designated as B-5) with the following values: softening point=108° C., acid value=14, hydroxyl value=20, and Mn=3,300.

REFERENCE EXAMPLE 12

667 g methyl isobutyl ketone, 30 g Perbutyl PV (brand name for a peroxide-type radical polymerization initiator from Nippon Oil and Fats Company, Limited), 15 g bis(1,2,2,6,6-pentamethyl-4-piperidinyl) sebacate, 608 g vinyl para-tert-butylbenzoate, 50 g cyclohexyl vinyl ether, and 92 g monobutyl fumarate were introduced into a pressure-resistant stainless steel reactor equipped with stirrer. The reactor was cooled to −70° C. with a dry ice/methanol bath and nitrogen gas was bubbled in so as to substitute nitrogen for the air in the pressure-resistant reactor. 250 g chlorotrifluoroethylene (liquefied for collection) was then added and the reactor was sealed. The reactor was thereafter placed in a thermostatted water bath at 70° C. and a reaction was run for 16 hours while stirring. The contents were subsequently removed and the solvent and volatile fraction were distilled out by heating under reduced pressure to yield a carboxyl-functional solid fluororesin (designated as B-6) with the following values: softening point=100° C., acid value=30, and Mn=6,000.

REFERENCE EXAMPLE 13

667 g xylene was introduced into a reactor equipped with a thermometer, stirrer, addition funnel, reflux condenser, and nitrogen inlet and was heated under a nitrogen blanket under reflux. To this was added over a period of 4 hours a mixture of 75 g methyl methacrylate, 125 g n-butyl methacrylate, 100 g cyclohexyl methacrylate, 400 g styrene, 300 g glycidyl methacrylate, and 30 g azobisisobutyronitrile as polymerization initiator. The reaction was then maintained under reflux for an additional 1 hour. The temperature was subsequently dropped to 100° C. and 5 g azobisisobutyronitrile was added. This same temperature was maintained for 2 hours in order to polymerize unreacted monomer and bring the polymerization reaction to completion. The solvent was then distilled out by heating under reduced pressure to yield a solid epoxy-functional acrylic resin (designated as C-1) with the following values: softening point=110° C., epoxy equivalent weight=490, and Mn=3,500.

EXAMPLES 1 to 18

Powder-paint resin compositions according to the present invention were prepared by first blending the various components in the recipes reported in Table 1 and then hot-kneading the blends at 100° C. using a Ko-Kneader (model PR-46, single-screw kneader mixer from the Buss Company of Switzerland). The resulting compositions were cooled, subjected to a coarse grinding, and then subjected to a fine grinding to give a powder paint with an average particle size of 30 to 40 micrometers. Each powder paint was applied to a coating thickness of 60 micrometers on zinc phosphate-treated steel sheet using an electrostatic powder painting apparatus from Onoda Cement Co., Ltd. This was followed by curing in a dryer at 180° C. for 20 minutes to yield the painted test sheet. The coating performance and paint properties were evaluated and these results are reported in Table 2.

COMPARATIVE EXAMPLES 1 to 4

Powder-paint resin compositions were prepared by first blending the various components in the recipes reported in Table 1 and then hot-kneading the blends at 100° C. using a Ko-Kneader (model PR-46, single-screw kneader mixer from the Buss Company of Switzerland). The resulting compositions were cooled, subjected to a coarse grinding, and then subjected to a fine grinding to give a powder paint with an average particle size of 30 to 40 micrometers. Each powder paint was applied to a coating thickness of 60 micrometers on zinc phosphate-treated steel sheet using an electrostatic powder painting apparatus from Onoda Cement Co., Ltd. This was followed by curing in a dryer at 180° C. for 20 minutes to yield the painted test sheet. The coating performance and paint properties were evaluated and these results are reported in Table 2.

TABLE 1

| recipe (weight parts) | examples | | | | | | | | | | | | | | | | | | comparative examples | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 1 | 2 | 3 | 4 |
| component A | | | | | | | | | | | | | | | | | | | | | | |
| organopolysiloxane | | | | | | | | | | | | | | | | | | | | | | |
| A-1 | 85 | | | 30 | | | | | | | 17 | 17 | | | | 33 | 27 | 54 | | | | |
| A-2 | | 95 | | | | 63 | 44 | | | | | | 25 | 26 | | | | | | | | |
| A-3 | | | 97 | | | | | 67 | | 42 | | | | | 85 | | | | | | | |
| A-4 | | | | | 88 | | | | 15 | | | | | | | | | | | | | |

TABLE 1-continued

| recipe (weight parts) | \multicolumn{18}{c}{examples} | | | | | | | | | | | | | | | | | comparative examples | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 1 | 2 | 3 | 4 |
| component B | | | | | | | | | | | | | | | | | | | | | | |
| 1,12-dodecane-dicarboxylic acid | 15 | | | | | 4 | | | | 16 | | | | | | | | | 15 | | | |
| trimellitic anhydride | | 5 | | | | | | | | | | | | 5 | | | | | | | | |
| dicyandiamide | | | 3 | | | | | | | | | | | | | | | | | | | |
| adipic dihydrazide | | | | 12 | | | | | | | | | | | | | | | | | | |
| acrylic resin B-1 | | | | | 37 | | | | | | | | | | | | 69 | | | 90 | | |
| acrylic resin B-2 | | | | | | | | | | | | | | | | 51 | | | | | | |
| acrylic resin B-3 | | | | | | | | 33 | | | | | | | | | | 27 | | | | |
| polyester resin B-4 | | | | | | | 70 | 52 | | | 81 | 80 | | | | | | | | | 93 | |
| polyester resin B-5 | | | | | | | | | | | | | 69 | 71 | | | | | | | | 82 |
| fluororesin B-6 | | | | | | | | | 85 | | | | | | | | | | | | | |
| component C | | | | | | | | | | | | | | | | | | | | | | |
| acrylic resin C-1 | | | | | | | | | | 42 | | | | | | | 19 | | | 85 | | 10 |
| triglycidyl isocyanurate | | | | | | | | | | | 3 | | | | | | | | | | 7 | |
| B-1530 (see *1) | | | | | | | | | | | | 6 | | | | | | | | | | 8 |
| BF-1540 (see *2) | | | | | | | | | | | | | | | 16 | | | | | | | |
| Primid XL-552 (see *3) | | | | | | | | | | | | | 2 | | | 10 | | | | 10 | | |
| Powderlink PL-1174 (see *4) | | | | | | | | | | | | | | 3 | | | | 4 | | | | |
| curing catalyst | | | | | | | | | | | | | | | | | | | | | | |
| dibutyltin dilaurate | | | | | | | | | | | | | 0.2 | | 0.2 | | | | | | | |
| para-toluenesulfonic acid | | | | | | | | 0.2 | | | | | | 0.1 | | 0.1 | | | | | | |
| triphenylphosphine | | | | | | 0.2 | | | | | | | | | | | | | | | | |
| additives | | | | | | | | | | | | | | | | | | | | | | |
| benzoin | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| Acronal 4F (see *5) | 1 | 1 | 1 | 1 | 1 | 1 | 1 | 1 | 1 | 1 | 1 | 1 | 1 | 1 | 1 | 1 | 1 | 1 | 1 | 1 | 1 | 1 |
| pigment | | | | | | | | | | | | | | | | | | | | | | |
| Tipaque CR-90 (see *6) | 43 | 43 | 43 | 43 | 43 | 43 | 43 | 43 | 43 | 43 | 43 | 43 | 43 | 43 | 43 | 43 | 43 | 43 | 43 | 43 | 43 | 43 |

Notes for Table 1.
*1 brand name for lactam-blocked isophorone diisocyanate from the Hüls Company
*2 brand name for uretodione-blocked isophorone diisocyanate from the Hüls Company
*3 brand name for N,N'-bis(2-hydroxyethyl)adipamide from the Rohm and Haas Company
*4 brand name for N,N,N',N'-tetramethoxymethylglycoluril from Cyanamid
*5 brand name for acrylic leveling agent from BASF
*6 brand name for titanium oxide from Ishihara Sangyo Kaisha Ltd.

TABLE 2

| | \multicolumn{18}{c}{examples} | | | | | | | | | | | | | | | | | comparative examples | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 1 | 2 | 3 | 4 |
| properties of the compositions | | | | | | | | | | | | | | | | | | | | | | |
| electrostatic properties (wraparound) (see *7) | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | △ | △ | ○ | ○ |
| storage stability (appearance after holding for 30 days at 35° C.) (see *8) | ⊙ | ⊙ | ⊙ | ⊙ | ○ | ⊙ | ○ | ⊙ | ⊙ | ⊙ | ○ | ○ | ○ | ○ | ⊙ | ⊙ | ○ | ⊙ | △ | ○ | ○ | ○ |
| properties of the cured coatings | | | | | | | | | | | | | | | | | | | | | | |
| appearance (smoothness) (see *9) | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ○ | △ | ○ | △ |
| gloss (see *10) | 89 | 88 | 87 | 89 | 90 | 88 | 89 | 88 | 87 | 89 | 90 | 88 | 90 | 91 | 88 | 90 | 89 | 90 | 85 | 83 | 84 | 82 |
| impact resistance (cm) 500 g × ½ inch (see *11) | 50 | 50 | 50 | 50 | 50 | 50 | 50 | 50 | 50 | 50 | 50 | 50 | 50 | 50 | 50 | 50 | 50 | 50 | 30 | 20 | 50 | 40 |
| staining resistance | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ⊙ | ○ | △ | △ | △ |

TABLE 2-continued

|  | examples | | | | | | | | | | | | | | | | | | comparative examples | | | |
|---|---|---|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 | 1 | 2 | 3 | 4 |
| (Black Magic) (see *12) | | | | | | | | | | | | | | | | | | | | | | |
| weathering resistance (sunshine, 2000 hours, GR %) (see *13) | 98 | 90 | 95 | 90 | 80 | 89 | 82 | 90 | 96 | 84 | 75 | 75 | 80 | 81 | 90 | 89 | 80 | 86 | 39 | 35 | 30 | 10 |

Notes for Table 2.

*7 An iron sheet (length 30 cm × width 30 cm × thickness 0.8 mm) was suspended vertically, and the powder paint was applied electrostatically from a horizontal distance of 30 cm from the center of the iron sheet, using a discharge rate of 200 g/minute and a voltage of 40 kV. Wraparound by the powder paint to the back surface of the iron sheet was evaluated on the following scale.
⊚: the powder paint had completely wrapped around on the back surface of the iron sheet
○: the powder paint had not wrapped around to the center of the back surface of the iron sheet, but had wrapped around to its peripheral surfaces
Δ: there was almost no wraparound by the powder paint even on the peripheral surfaces of the back of the iron sheet
*8 The powder paint was stored in a thermostat at 35° C. for 30 days and then applied. Using the scale given below, the appearance was evaluated relative to that prior to storage.
⊚: absolutely no difference was observed
○: a slight difference was observed
Δ: a substantial difference was observed
*9 A fluorescent lamp was projected onto the cured film and the degree of distortion observed in the image of the fluorescent lamp was evaluated on the following scale.
⊚: absolutely no distortion was observed
○: a slight distortion was observed
Δ: a large distortion was observed and the image of the fluorescent lamp could not be distinguished
*10 The 60° specular gloss was evaluated according to JIS (Japanese Industrial Standard) K 5400.
*11 Using the Dupont impact deformation tester specified in JIS K 5400, the height (cm) was measured at which cracking and exfoliation did not occur.
*12. A line was drawn on the test specimen using a Black Magic Ink marker. After then holding the test specimen at 25° C. for 24 hours, it was wiped off with gauze impregnated with xylene/methanol = 1/1. The sample was thereafter evaluated for traces of the Black Magic Ink according to the following scale.
⊚: absolutely no traces were observed
○: slight traces were observed
Δ: clear traces of the Black Magic Ink were observed
*13 The gloss retention in % was determined after a 2,000-hour test using a sunshine carbon weathermeter according to the "Accelerated Weathering Test Methods" of JIS D 0205.

INDUSTRIAL UTILITY

As has been described in the preceding, the powder-paint resin composition according to the present invention exhibits an excellent curability as well as excellent electrostatic properties (wraparound). Moreover, this composition provides a cured coating with an excellent appearance, excellent resistance to weathering, and excellent mechanical properties. As a consequence of these features and characteristics, the powder-paint resin composition according to the present invention can be used as a corrosion-preventing paint for automotive top coats, automotive middle coats, auto parts, construction materials, both the interior and exterior coatings of steel pipe, chemical equipment and machinery, washers and refrigerators, guardrails, and so forth. The powder-paint resin composition according to the present invention can also be used as an electrically insulating paint for electrically insulating components, switches, gears, condensers, motors, electric wire and cable, and the like. It can also be used as a decorative or trim paint for household appliances, decorative building materials, office machines, etc.

We claim:

1. Resin composition for powder paints, said composition comprising:

(A) epoxy-functional branched organopolysiloxane having a softening point in a range of room temperature to 150° C., and (B) at least one compound selected from the group consisting of acrylic resins containing aromatic vinyl monomeric units in an amount of from 5 to 70 wt %, and fluororesins, said compound bearing a functional group reactive with the epoxy group and being solid at room temperature, (C) wherein the weight ratio between the component (A)/component (B) is in a range of 2/98 to 98/2 and the resin composition produces a cured coating in which component (A) reacts with component (B).

2. Resin composition according to claim 1 for powder paints, characterized in that component (A) is epoxy-functional branched organopolysiloxane with general formula (I)

$$(RSiO_{3/2})_a(R_2SiO_{2/2})_b(SiO_{4/2})_c \qquad (I)$$

wherein R is at least 1 selection from the set consisting of monovalent hydrocarbon groups, alkoxy groups, the hydroxyl group, and epoxy-functional monovalent organic groups with the proviso that the said epoxy-functional monovalent organic group constitutes 0.1 to 100 mole % of the total R in this organopolysiloxane (I), and wherein a is a positive number, b is zero or a positive number, and c is zero or a positive number.

3. Resin composition according to claim 2 for powder paints, characterized in that the epoxy-functional monovalent organic group constitutes 0.1 to 70 mole % and the phenyl group constitutes 30 to 99.9 mole %, in each case of the total R in the organopolysiloxane with general formula (I).

4. Resin composition according to claim 1 for powder paints, characterized in that component (A) is epoxy-functional branched organopolysiloxane with general formula (II)

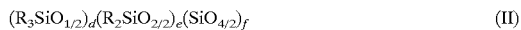
$$(R_3SiO_{1/2})_d(R_2SiO_{2/2})_e(SiO_{4/2})_f \quad (II)$$

wherein R is at least 1 selection from the set consisting of monovalent hydrocarbon groups, alkoxy groups, the hydroxyl group, and epoxy-functional monovalent organic groups with the proviso that the said epoxy-functional monovalent organic group constitutes 0.1 to 70 mole % of the total R in this organopolysiloxane (II), and wherein d is a positive number, e is zero or a positive number, and f is a positive number.

5. Resin composition according to claim 4 for powder paints, characterized in that the epoxy-functional monovalent organic group constitutes 0.1 to 70 mole % and the phenyl group constitutes 30 to 99.9 mole %, in each case of the total R in the organopolysiloxane with general formula (II).

6. Resin composition according to claim 1 for powder paints, characterized in that component (A) is epoxy-functional branched organopolysiloxane with general formula (III)

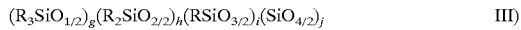
$$(R_3SiO_{1/2})_g(R_2SiO_{2/2})_h(RSiO_{3/2})_i(SiO_{4/2})_j \quad (III)$$

wherein R is at least 1 selection from the set consisting of monovalent hydrocarbon groups, alkoxy groups, the hydroxyl group, and epoxy-functional monovalent organic groups with the proviso that the said epoxy-functional monovalent organic group constitutes 0.1 to 70 mole % of the total R in this organopolysiloxane (III), and wherein g is a positive number, h is a positive number, i is a positive number, and j is zero or a positive number.

7. Resin composition according to claim 6 for powder paints, characterized in that the epoxy-functional monovalent organic group constitutes 0.1 to 70 mole % and the phenyl group constitutes 30 to 99.9 mole %, in each case of the total R in the organopolysiloxane with general formula (III).

8. Resin composition according to claim 1 for powder paints, characterized in that the epoxy-reactive functional group in component (B) consists of at least 1 selection from the set consisting of amino groups, the carboxyl group, carboxylic anhydride moieties, the hydroxyl group, and the tert-butyl ester moiety.

9. Resin composition for powder paints according to claim 1, wherein the composition (B) is an organic resin having an acid value in a range of 10 to 300 and/or a hydroxyl value in a range of 0 to 100.

* * * * *